2,910,079

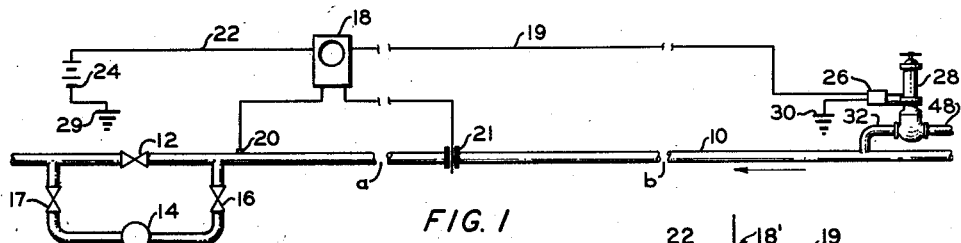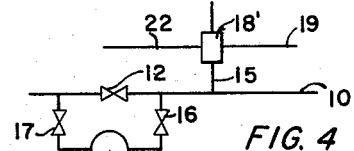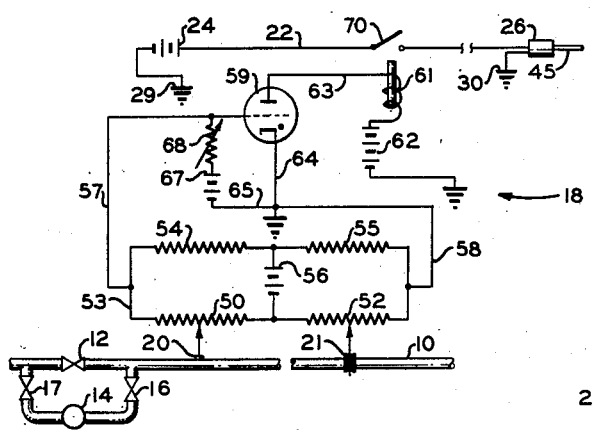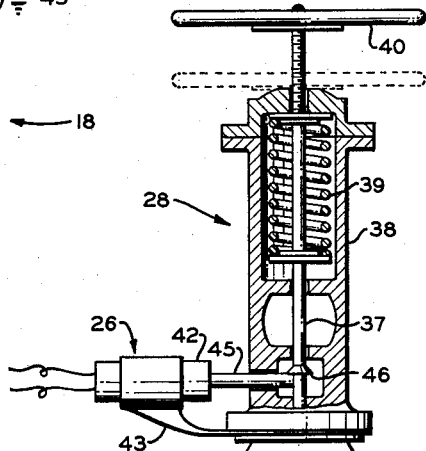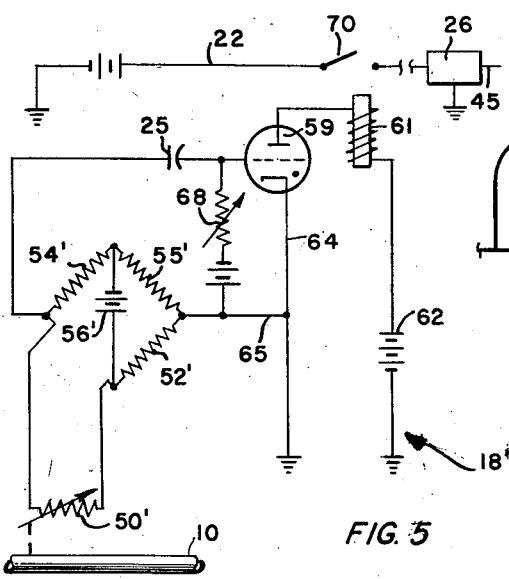
INVENTOR.
B. E. BEEGHLY
BY Hudson & Young
ATTORNEYS United States Patent Office 2,910,079
Patented Oct. 27, 1959

PROCESS AND APPARATUS FOR CONTROLLING LIQUID PRESSURE SURGE IN A LINE

Bert Eugene Beeghly, Bartlesville, Okla., assignor to Phillips Petroleum Company, a corporation of Delaware Application April 18, 1955, Serial No. 501,823

12 Claims. (Cl. 137—14)

This invention relates to a process and apparatus for controlling a liquid pressure surge in an elongated conduit such as a pipe line carrying liquid products.

The use of pipe lines for long distance transmission of liquids, such as gasoline, liquefied petroleum products, and various refined components of crude oil, etc., is well known. In the operation of these pipe lines sudden changes in the velocity of the liquid being transferred due to the sudden closing of a valve or the stopping of a pump in the line create pressure surges or water hammer. These pressure surges travel upstream in the liquid flow line from a section of relatively low pressure to one of relatively high pressure where the increased pressure due to the surge frequently causes damage to the line and equipment, including bursting of the pipe line. A number of surge-controlling devices have been developed to bring the column of moving liquid to a more gradual stop. Prior art devices may be divided into two basic types, viz., those which bypass some of the liquid around the shut off valve and those which temporarily store some of the liquid in a tank or compression chamber. The first type includes relief valves and automatic surge suppressors. The second type includes surge tanks, air chambers and diaphragms, and piston and bellows type suppressors. All of these devices function with varying degrees of effectiveness but they also have certain disadvantages. The need for a more positive and effective surge control method and device is well recognized.

The principal object of the invention is to provide a process and apparatus for controlling and depleting a liquid pressure surge in a pipe line or similar conduit. Another object is to provide a process and arrangement of apparatus for preventing damage to equipment from pressure surges in a pipe line carrying a liquid stream. A further object of the invention is to provide a process and arrangement of apparatus for operating a rapid acting flow control valve in response to a pressure surge in a line carrying a liquid stream. Other objects of the invention will become apparent from a consideration of the accompanying disclosure.

It have devised a valve and a control system therefor which serve to control pipe line surges and prevent their buildup to damaging values and a method or process for sensing a pressure surge in a line in a section thereof in the vicinity of the origin of the surge and actuating a relief valve in the line upstream of the sensing point in response to the sensing thereof. The relief valve comprises a rapid acting valve which is solenoid actuated and spring operated and is actuated when a sensing device closes a switch or relay in a circuit connecting a source of current, such as a battery, with the circuit in the solenoid. One arrangement of apparatus utilizes a differential pressure switch which is sensitive to differential pressure between separated points in the pipe line positioned in the vicinity of the origin of the surge and which operates to close the circuit between the current source and the solenoid when a predetermined pressure differential in the pipe line is reached.

Another arrangement of apparatus utilizes a pair of electrical pressure sensing devices connected directly to the pipe line at spaced-apart points near the origin of the pressure surge and these devices are connected in an electrical bridge circuit which actuates a relay switch in the circuit from the current source to the solenoid when a predetermined pressure differential in the pipe line is reached. In another embodiment of the invention a single electric pressure cell is connected directly with the pipe line in the vicinity of the origin of the surge and this cell is connected with a differentiating electrical circuit which operates a relay switch in the circuit between the current source and the solenoid.

The method of the invention comprises sensing a pressure surge in the vicinity of the origin thereof so as to set up a mechanical or electrical impulse which actuates or triggers an electrical circuit which, in turn, operates a fast-acting valve at a point in the pipe line upstream of the sensing point a sufficient distance to permit the electrical impulse thus generated, or set up, to operate the relief valve before the pressure surge arrives at or passes the point at which the relief valve is connected with the pipe line. Usually the relief valve is positioned upstream from the sensing point a distance of at least about one mile to permit sufficient time lag before the surge reaches the relief valve to give the control apparatus time to act and effect the opening of the relief valve.

More complete understanding of the invention may be obtained by reference to the accompanying drawing of which Figure 1 is a plan view of the control apparatus in relation to a section of pipe line; Figure 2 is an elevation, partly in section, of a rapid acting relief valve adapted for use in the apparatus of the invention; Figure 3 is a diagram of an electrical circuit for one arrangement of electrical apparatus for effecting the process of the invention; Figure 4 is a view similar to Figure 1 showing another embodiment of the invention; and Figure 5 is a view similar to Figure 3 showing circuitry for the embodiment of Figure 4. The figures are schematic and corresponding parts of the various figures are correspondingly numbered.

Referring to Figure 1, a pipe line 10, shown broken at a and b, contains a shut off valve 12 and a pump 14. Valves 16 and 17 are provided for cutting off flow of liquid either side of pump 14. A differential pressure switch 18 is connected with line 10 at pressure sensing points 20 and 21. Switch 18 is positioned in circuit 22 extending from battery 24 to a solenoid 26 on relief valve 28. Battery or current source 24 is grounded at 29 and solenoid 26 is grounded at 30. Valve 28 is positioned in bleed line 32 which is connected with line 10 at a distance at least about a mile upstream from sensing point 21. Pressure sensing points 20 and 21 may be spaced any suitable distance apart, such as in the range of about 50 to 100 feet. This distance may be lesser or greater in accordance with the sensitivity of the sensing device.

Figure 2 shows the construction of relief valve 28 which comprises a valve body 34 containing a valve seat 35, valve disk or head 36, valve stem 37, yoke 38, compression spring 39, and hand wheel 40. A solenoid 42 is attached to the valve housing by means of bracket 43 and is provided with solenoid-actuated plunger 45 which extends from the solenoid into the valve housing to stem 37 provided with a shoulder 46. Valve 28 is closed by rotating hand wheel 40 on the upper threaded portion of stem 37 until valve head 36 is in contact with seat 35. At this time plunger 45 supports stem 37 and valve head 36 by means of shoulder 46. Hand wheel 40 can now be turned in the opposite direction until it is raised well above the upper portion of yoke 38 so that it does not interfere with the subsequent automatic valve opening when solenoid 42 is actuated. When solenoid 42 is energized, plunger 45 is withdrawn or moved to the left, allowing spring 39 to rapidly force valve head 36 to the open position. Line 48 which connects with the outlet port of valve 38 leads to any suitable receptacle for the liquid when is bled off through the relief valve.

Various types of differential pressure switches commercially available on the market may be utilized as element 18 of Figure 1. This instrument is set to operate only when unusual pressure differential occurs between points 20 and 21. Normal pressure changes in pipe line 10 do not actuate the pressure relief system since the pressure differential developed between taps 20 and 21 is small. However, when a rapid pressure increase occurs such as one due to rapid closing of valve 12 or shutting down of pump 14, a momentary abnormal pressure differential between points 20 and 21 is established. This pressure differential causes switch 18 to close, thus completing a circuit from current source 24 through line 22 and solenoid 26 to ground 30 so that plunger 45 is withdrawn sufficiently to allow valve 28 to open. In this manner as the surge in pipe line 10 reaches line 32 the pressure of the surge is bled off through valve 28 thereby preventing dangerous build up of pressure upstream of line 32 or valve 28.

Liquid pressure surge in line 10 will travel at a rate in the range of about 3000 to 6000 feet per second (rate of sound waves therein) depending upon the density or composition of the liquid in the stream flowing in the line, the temperature of the liquid, and the pressure in the line. When the time lag in the operation of a given control system is known and the characteristics of the liquid stream flowing are also known, the distance between the sensing point and the location of valve 28 can be readily calculated so that a valve can be placed a sufficient distance to permit the electrical signal to outrace the pressure surge and actuate valve 28 before the pressure surge arrives at the valve location. Generally this distance will be at least one mile upstream from the pressure sensing device.

Referring to Figure 3, a pair of liquid-pressure cells 50 and 52 are tapped into line 10 at points 20 and 21. The heart of the cell is a pressure-sensitive tube to the outside of which is bonded a wire grid carrying an electric current. The liquid whose pressure is to be measured enters this tube thereby causing it to expand and stretch the fine wire of the grid so that the electrical resistance thereof is increased. This change in resistance is utilized to trip a relay through arrangement of the two cells in a bridge circuit 53 comprising resistances 54 and 55 and current source 56 connected as shown. Leads 57 and 58 from bridge circuit 53 are connected with a thyratron tube 59 in a relay circuit including relay 61, current source 62, lines 63 and 64, the latter being grounded. Thyratron 59 puts out a signal or current only when the signal in line 57 is positive. A positive signal is transmitted through line 57 only when the pressure sensed by cell 50 is greater than the pressure sensed by cell 52. In instances where the pressure sensed by cell 52 is greater than that sensed by cell 50, the signal in line 57 is negative while that in line 58 is positive, and thyratron 59 does not put out a signal.

In order to avoid operation of relay 61 when only a normal pressure differential exists between points 20 and 21, a bias battery 67 is connected with lead 57 through a variable resistor 68 and with the thyratron through lines 64 and 65. The resulting biased circuit establishes a negative potential which must be overcome and exceeded by the positive signal in line 57 in order to actuate thyratron 59. Hence, variable resistor 68 can be adjusted to the desired sensitivity of the actuating mechanism or circuit. When thyratron 59 is positively actuated, relay 61 closes switch 70 in line 22 thereby energizing solenoid 26 and opening valve 28 by withdrawing plunger 45. It is also feasible to connect thyratron tube 59 directly in line 22 so that when tube 59 is energized by the bridge circuit 53 circuit 22 is closed thereby energizing solenoid 26. In this arrangement tube 59 acts directly as a switch in line 22 so as to close the circuit from battery 29 through solenoid 26, thereby reducing the time lag in operation a small amount.

A liquid pressure cell suitable for use in the invention is available from the Baldwin Locomotive Works of Philadelphia, Pa., as "SR–4" Fluid Pressure Cell. Similar devices of other manufacturers are also suitable for use in the invention.

Another embodiment of the invention utilizes a single liquid-pressure cell or strain gauge tapped into line 10 at the desired surge sensing point, as shown in Figures 4 and 5, and this cell is connected with a conventional differentiating circuit 18 which operates relay 61 through thyratron tube 59. This arrangement of control apparatus utilizes the rate-of-change of pressure in line 10 as the triggering force for establishing the circuit through the solenoid. The device is designed and provided with condenser 25 so that the rate-of-change of pressure in line 10 must reach predetermined values greater than normally occurring in the line under standard flow conditions in order to actuate thyratron 59 thereby avoiding operation of the control system under normal rate-of-pressure changes. A conventional differentiating circuit referred to above is illustrated in Air Force Manual 52–8 "Radar Circuit Analysis," pp. 6–14 and 6–15, published by the Department of the Air Force, a copy of which is available from the Superintendent of Documents, Washington 25, D.C. Variable resistance 50' in Figure 5 constitutes one resistance of a bridge circuit and is sensitive to rate-of-change of pressure in line 10. Excessive rate-of-change of pressure resulting from a pressure surge causes current to flow through condenser 25 and thyratron 59, thereby actuating switch 70 so as to operate the solenoid 42 and plunger 45 on the relief valve 28.

Certain modifications of the invention will become apparent to those skilled in the art and the illustrative details disclosed are not to be construed as imposing unnecessary limitations on the invention.

I claim:

1. Apparatus for pipe line surge control of liquid surges therein comprising a pipe line carrying liquid under pressure; pressure surge sensing means adapted to sense a pressure surge in a liquid in said line in the vicinity of the origin thereof traveling at the speed of sound in said liquid; a rapid acting valve in a bleed line upstream of said surge-sensing means a distance such that the time for said surge to travel said distance is greater than the time required to sense said surge, energize the subsequently named actuating means, and effect opening of said valve; electrical actuating means for actuating said valve; a source of current for operating last said means; and means for connecting said source of current with the actuating means on said valve in response to said surge-sensing means.

2. The apparatus of claim 1 wherein said surge-sensing means comprises a differential-pressure-sensing device and said means for connecting said source of current with the actuating means on said valve comprises a switch actuated by said device.

3. The apparatus of claim 1 wherein said surge-sensing means comprises a rate-of-change-of-pressure-sensing device and said means for connecting said source of current with the operating means on said valve comprises a switch actuated by said device.

4. Apparatus for pipe line pressure surge control of liquid surges therein comprising a pipe line carrying liquid under pressure; a pressure differential switch operatively connected at points spaced at least 50 feet apart in said pipe line upstream of a pressure surge-causing device therein; a bleed line connected with said pipe line upstream from said pressure switch; a rapid opening electrically actuated valve in said bleed line; a current source connected through said switch to the actuating mechanism of said valve, the distance between the pressure-switch connection with said pipe line and the bleed-line connection therewith being such that the time for said surge to travel said distance is greater than the time required to sense said surge, operate said switch, actuate said actuating mechanism, and open said valve.

5. The apparatus of claim 4 wherein said valve comprises a solenoid-actuated, spring-operated valve.

6. A process for controlling a pressure surge in an extended conduit in which a liquid is flowing under pressure, comprising sensing said pressure surge in the vicinity of its origin and transmitting an electrical signal in response to said sensing to an electrically actuated relief flow-control zone in said conduit upstream of the pressure sensing point a distance such that the time for said surge to travel said distance is greater than the time required to sense said surge, transmit said signal, and effect flow thru said zone so as to open said relief flow-control zone before said pressure surge, traveling at the rate of sound in said liquid, reaches same and vent liquid from said line, thereby controlling said surge.

7. A process for controlling a pressure surge, traveling at the rate of sound in said liquid, in an extended conduit in which a liquid is flowing under pressure, comprising sensing pressure differential in said conduit between spaced-apart points in the vicinity of the origin of said surge; when said pressure differential reaches a predetermined value, utilizing same to pass an electric signal to an electrical operating mechanism in operative control of a relief flow-control zone connected with said conduit at a point a distance of at least one mile upstream of said points said distance being such that the time for said surge to travel said distance is greater than the time required to sense said predetermined pressure differential, transmit said signal, and open said zone to flow so as to open said zone to flow before said surge arrives, thereby depleting said pressure surge.

8. A process for controlling a pressure surge in a liquid under pressure, traveling at the rate of sound in said liquid, in an extended conduit in which said liquid is flowing, comprising sensing rate-of-change of pressure in a section of said conduit in the vicinity of said surge; when said rate-of-change reaches a predetermined value, utilizing same to pass an electric signal to an electrical operating mechanism in operative control of a flow-control zone connected with said conduit at a point upstream of said section a distance such that the time for said surge to travel said distance is greater than the time required to sense said rate-of-change of pressure, transmit said signal, and effect flow thru said zone so as to open said zone to flow before said surge arrives, thereby depleting said pressure surge.

9. Apparatus for pipe line pressure-surge control comprising a pipe line carrying a liquid under pressure; means for sensing a pressure surge in said line traveling at the speed of sound in said liquid therein in the vicinity of the origin thereof; a rapid acting valve in a bleed line leading out of said pipe line upstream of aforesaid means a distance of at least one mile and sufficient that the time for said surge to travel said distance is greater than the time required to sense said surge, transmit the subsequently named impulse, and effect opening of said valve; electrical actuating means for actuating said valve; a source of current for said actuating means; and means for transmitting an actuating impulse from said pressure surge sensing means to said actuating means ahead of said pressure surge.

10. Apparatus for pipe line pressure-surge control comprising a pipe line carrying a liquid under pressure; means for sensing a pressure surge in said line traveling at the speed of sound in said liquid therein in the vicinity of the origin thereof and sending out an impulse; a rapid acting valve in a bleed line in said pipeline upstream of said means a distance of at least a mile and such that the time for said surge to travel said distance is greater than the time required to sense said surge, transmit the subsequently named impulse, and effect opening of said valve; electrical actuating means for opening said valve; a circuit sensitive to said impulse and operatively connected with a source of current and with said electrical actuating means so as to transmit an electrical signal to said actuating means which outraces the pressure surge to said valve.

11. Apparatus for control of liquid surges in a pipe line comprising in combination a pipe line carrying liquid flowing under pressure; surge sensing means adapted to sense a pressure surge in the liquid in said line downstream of the origin of said surge traveling at the speed of sound in said liquid and emit an electrical signal; means for relieving said surge sensitive to said electrical signal and positioned upstream of said surge sensing means a distance such that the time for said surge to travel said distance is greater than the time required to sense said surge, transmit said signal, and effect opening of said valve; electrical actuating means responsive to said surge sensing means in actuating control of said means for relieving said surge by means of said electrical signal; and a source of current for said actuating means.

12. A process for relieving a pressure surge in a pipe line carrying a liquid flowing under pressure, comprising sensing said pressure surge in said liquid downstream of its origin and transmitting an electrical signal in response to said sensing to an electrically actuated relief device in said pipe line upstream of said surge sensing point before said surge reaches said device so as to relieve said surge, said relief device being positioned upstream of said surve sensing point a distance such that the time required for said surge to travel said distance is greater than the time required to sense said surge, transmit said signal, and effect actuation of said device.

References Cited in the file of this patent

UNITED STATES PATENTS

| | | |
|---|---|---|
| 1,494,856 | Mase | May 20, 1924 |
| 2,050,020 | Schmidt | Aug. 4, 1936 |
| 2,207,809 | Lauffer et al. | July 16, 1940 |
| 2,459,000 | Morris | Jan. 11, 1949 |